(12) United States Patent
Kerr

(10) Patent No.: US 10,000,933 B2
(45) Date of Patent: Jun. 19, 2018

(54) FLATPACK GUTTER TRAP

(71) Applicant: Daniel Allen Kerr, Vancouver, WA (US)

(72) Inventor: Daniel Allen Kerr, Vancouver, WA (US)

(*) Notice: Subject to any disclaimer, the term of this patent is extended or adjusted under 35 U.S.C. 154(b) by 0 days. days.

(21) Appl. No.: 15/007,448

(22) Filed: Jan. 27, 2016

(65) Prior Publication Data

US 2017/0211277 A1    Jul. 27, 2017

(51) Int. Cl.
*E04D 13/08*     (2006.01)
*B01D 29/05*    (2006.01)
*E04D 13/076*    (2006.01)
*E03B 3/02*      (2006.01)
*B01D 35/02*    (2006.01)

(52) U.S. Cl.
CPC ............. *E04D 13/08* (2013.01); *B01D 29/05* (2013.01); *B01D 35/02* (2013.01); *E03B 3/02* (2013.01); *E04D 13/0767* (2013.01); *E04D 2013/0806* (2013.01); *E04D 2013/086* (2013.01)

(58) Field of Classification Search
CPC ... E04D 13/076; E04D 13/0767; E04D 13/08; E04D 2013/0806; E04D 2013/086; E03B 3/02; B01D 35/02; Y10T 428/24273; Y10T 428/24479; Y10T 428/2457; Y10T 428/12257
USPC .... 210/162, 170.03, 232, 433.1, 459; 52/12, 52/16; 428/131, 156, 167, 581
See application file for complete search history.

(56) References Cited

U.S. PATENT DOCUMENTS

| | | | | |
|---|---|---|---|---|
| 225,237 | A * | 3/1880 | Reber | F24F 13/0218 52/16 |
| 1,526,825 | A * | 2/1925 | Bohnsack | E04D 13/08 52/16 |
| 2,669,197 | A * | 2/1954 | Tusten | E04D 13/076 210/162 |
| 3,048,983 | A * | 8/1962 | Crummel | E04D 13/08 404/2 |
| 4,328,694 | A * | 5/1982 | Beaumont | E04D 13/0645 405/120 |
| 4,421,644 | A * | 12/1983 | Gedye | B01D 29/01 210/232 |
| 4,472,274 | A * | 9/1984 | Williams | E04D 13/08 210/459 |
| 5,709,051 | A * | 1/1998 | Mazziotti | E04D 13/076 210/162 |
| 5,935,450 | A * | 8/1999 | Benedict | E04H 4/1272 210/232 |
| 6,308,464 | B1 * | 10/2001 | Demartini | E04D 13/08 52/16 |
| 6,497,816 | B2 * | 12/2002 | Naddy | E04D 13/0767 210/162 |
| 2006/0191208 | A1 * | 8/2006 | MacIntyre | E04D 13/0767 52/12 |

(Continued)

*Primary Examiner* — Christopher Upton

(57) ABSTRACT

A one piece, planar flatpack gutter trap formed and creased on its top surface in a configuration so as to allow assembly into a gutter system trap. It is capable of folding assembly on a job site with a minimum of hand tools and an object with a sharp linear edge. It has a leaf guard incorporated thereon that is capable of locking the gutter trap in its assembled configuration to prevent the collapse of the leaf trap and to increase the lateral stability of the device.

4 Claims, 6 Drawing Sheets

(56) References Cited

U.S. PATENT DOCUMENTS

2011/0203191 A1\* 8/2011 Argentina ........... E04D 13/0645
52/12

\* cited by examiner

FLATPACK GUTTER TRAP

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to economical packaging for shipment and sales of gutter components and more particularly to flatpack assembly design technology.

BACKGROUND

Gutter systems for residential as well as industrial and commercial buildings are mandated in many districts by local and state ordinances. Generally, these are installed by professionals for a plethora of reasons, such as the heights involved, the necessity for specialized equipment and tools, and the repercussions that accompany improper installation.

The components such as the gutter, the downspouts, the gutter traps, outlets and elbows have traditionally been bulky and require copious amounts of space to transport. Many of the modern installers have gone to roll to size gutter forming machines that make the gutters and downspouts themselves from spools of flat aluminum that sit on the back of a service vehicle. These offer a dramatic reduction in the space occupied by these components. In this way the installers can minimize their trips to the shop for gutter parts as their vehicles empty. While this saves time for the installer and money to the consumer, it does not alleviate the problem of unnecessary spatial consumption by the remaining components.

Traditionally, the remaining components are bought assembled from a manufacturer or if the installer is large enough and can afford the space and equipment, are cut, bent into shape on a machine brake and assembled back at the shop. Thus, they are transported at full volume in a ready to install format.

Henceforth, improved gutter system components that occupy a minimal of space would fulfill a long felt need in the industry. This new invention utilizes and combines known and new technologies in a unique and novel configuration to overcome the aforementioned problems and accomplish this.

BRIEF SUMMARY

In accordance with various embodiments, a flatpack gutter component for the transportation and storage of bulk quantities is provided.

In one aspect, a flatpack gutter component able to be assembled flawlessly in the field with a minimal of effort, time and tools is provided.

In a different aspect a flatpack gutter component able to be assembled into a trap adapted for insertion into a drain pipe and having a U shapped opening thereon a top thereof for the retention of a drainpipe.

In another aspect, a one piece flatpack gutter trap is provided, capable of folding assembly on site and having a leaf guard incorporated thereon that is capable of locking the assembled gutter trap in its assembled configuration.

In yet another aspect, a gutter trap is provided that has a non-collapsible, non removable, leaf guard.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the term "flatpack" refers to a generally planar substrate that is configured for assembled into an article of manufacture.

As used herein the term "crease" refers to any of a bendable line formed thereon a planar substrate by a weakening of the substrate along the line with respect to the surrounding area of the planar substrate. This weakening is accomplished by the compression, removal or pre-fatiguing of the material along the line.

In shedding water off of a roof, organic debris and parts from degrading shingles, shakes and roofing materials are carried with the water along the gutters to the gutter outlets and downspouts. Plugging is a frequent occurrence especially where there is heavy foliage around the building. While this is easily remedied in gutter systems that spill their water onto the ground surface, this is not so where the downspouts are connected to underground drain lines that divert the water to the street or elsewhere. Here the blockages cannot be easily reached and require special equipment to open up.

Figure 13:
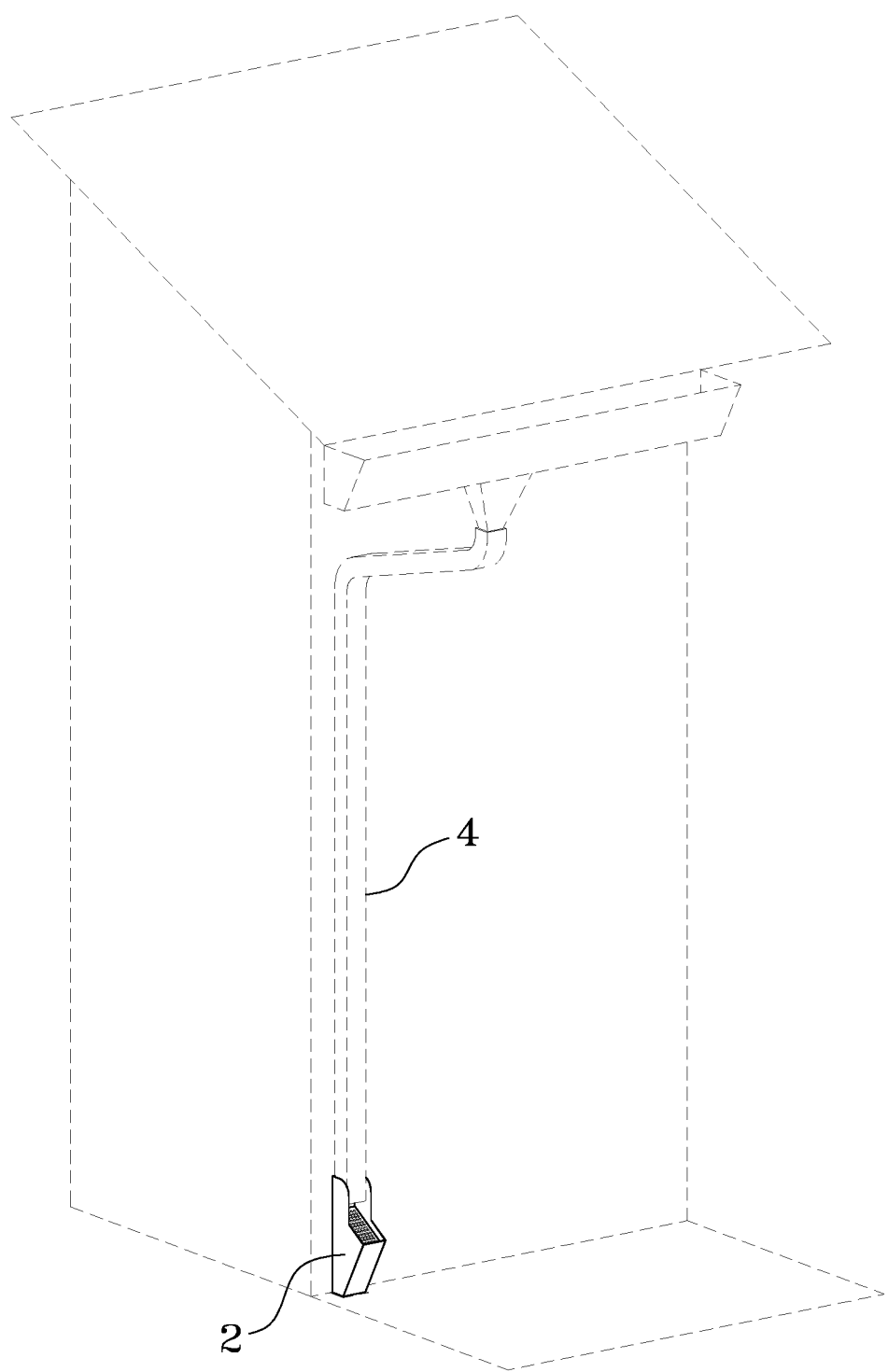
FIG. 13 is a perspective view of an installed flatpack gutter trap in a conventional gutter system.

These gutter systems with underground drain lines (FIG. 13) can benefit from the installation of a trap 2 to collect the organic mater and degrading roofing material at the bottom of the downspout 4, before it can get into the drain line and cause plugging. The present invention relates to a novel design for flatpack gutter trap 2.

The function of the flatpack gutter trap 2 is to allow a number of geometrically pre cut, planar substrates to be stored, sold and transported to the jobsite where they can be assembled just prior to use by an unskilled worker with the use of either no tools or a minimum of tools. Currently the prior art devices are formed in a factory using a set of templates that bend the substrate in a machine break or they are made by injection molding.

Figure 2:
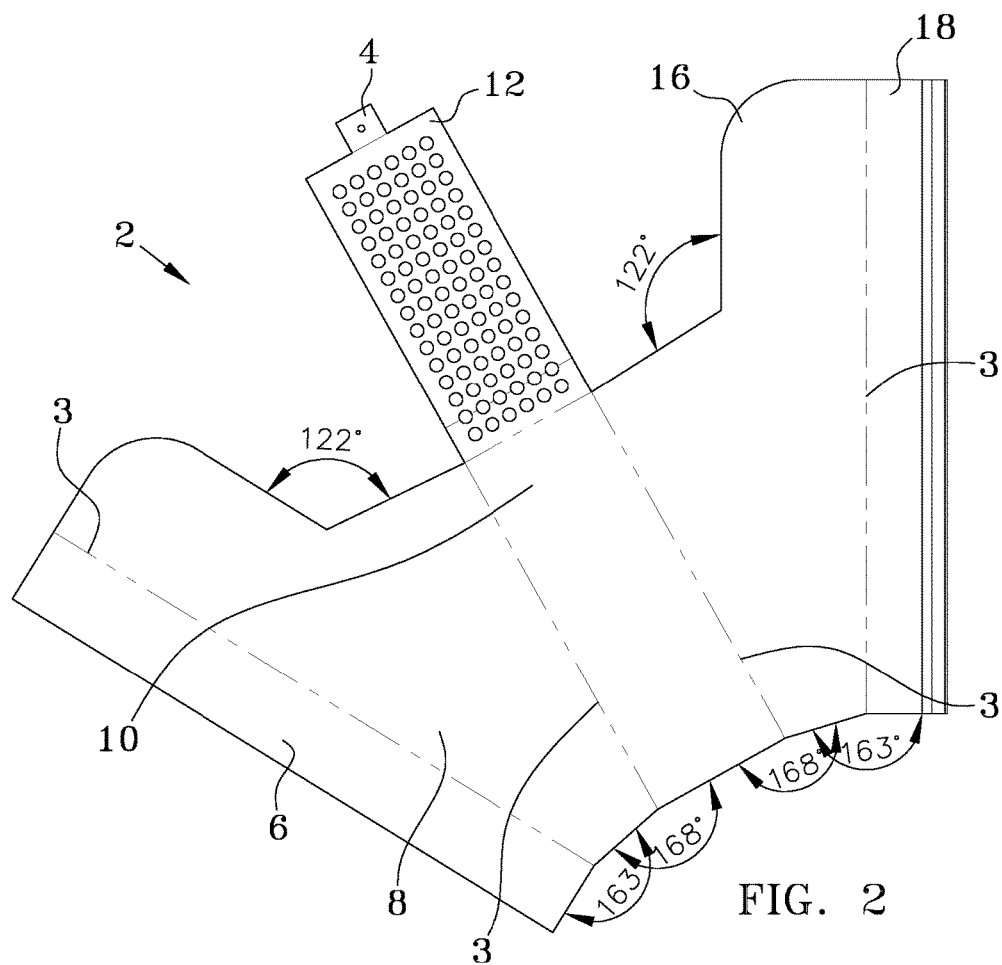
FIG. 2 is a top view of a first embodiment gutter trap in its flatpack configuration.
Figure 3:
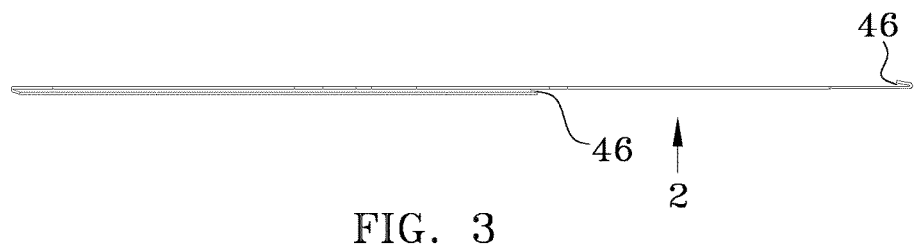
FIG. 3 is an end view of a second embodiment gutter trap in its flatpack configuration.

Looking at the first embodiment of FIG. 2, it can be seen that the flatpack gutter trap 2 is a unitary piece of a planar substrate that has seven contiguous regions (plates) that are bounded by six uninterrupted crease lines 3 (meaning the crease lines continue across the entire face of the plate from between its opposite edges.) In order these regions are: back inner seam plate 6, first side plate 8, front (center) plate 10, leaf guard plate 12, lock plate 14, second side plate 16 and back outer seam plate 18. The front (center) plate 10 has three creases formed along three of its four edges (both of its parallel side edges and its top edge), and extending beyond each of the three creases (on three of its edges) is a pair of sequentially connected plates. Stated otherwise, of these seven contiguous plates, five plates are consecutively adjacent (throughout an unbroken linear sequence) with the remaining two plates consecutively adjacent and extending from the central plate of the consecutively adjacent five series of plates. The linear axis of the contiguous five plates lies perpendicular to the linear axis of the two remaining plates (the leaf guard plate 12 and the lock plate 14). The linear axis of the central plate is collinear with the linear axis of the two remaining plates.

Three of the plates, back inner seam plate 6, back outer seam plate 18 and lock plate 14 have one creased side edge. Three plates, first side plate 8, second side plate 16 and leaf guard plate 12, have two creased side edges, and the front (central) plate has three creased side edges, two creases of which are parallel to each other and both perpendicular to the remaining top edge crease. The leaf guard plate 12 has a series of orifices formed therethrough, although these may be any of a hole, a slit, an expanded metal, a grate or mesh. The size of the orifices are sized to prevent common organic debris such as leaves from passing. Preferably, these orifices will be in the ½ and ¾ inch range.

Figure 9:
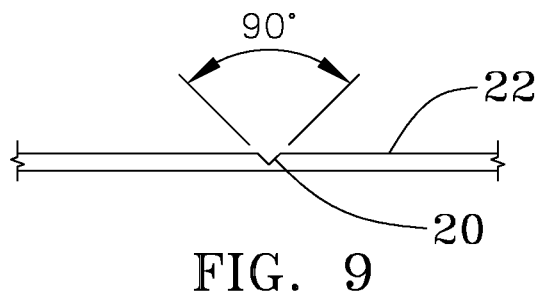
FIG. 9 is an end view of the creased fold line of the gutter trap in a flatpack configuration.

Looking at FIG. 9 it can be seen that the style of crease lines depicted for use in the first and second embodiments are 90 degree, linear "V" notches 20 cut or formed into the top face 22 of the planar substrate. This top face of the flatpack gutter trap 2 in the planar configuration, will be the inner face of the gutter trap 2 when fully assembled. (FIGS. 10-12) The 90 degree notch refers to the included angle between the walls of the notch. The exterior obtuse angle between each of the walls of the notch 20 and the top face 22 of the planar substrate is 135 degrees. In this manner, when opposing forces are applied to adjacent plates, and the top face is folded inward, the adjacent plates fold toward each other along the thinner, weakened crease line, until the walls of the notch 20 contact each other and the adjacent plates reside perpendicular to each other with an included angle of 90 degrees between them. This method of bending is applied at all creases 3 to form the trap 2 except for the crease between the lock plate 14 and the leaf guard 12. This crease is bent in the reverse direction. There is no advantage to this except that during fabrication, all creases can be formed onto just once face of the planar substrate. The creases 3 need not be of a "V" notch as other shapes as would be known by one or ordinary skill in the art could be used. One such crease could use a "U" notch.

Figure 1:
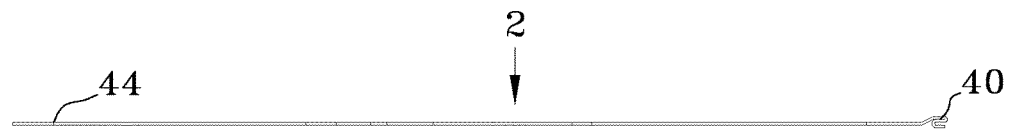
FIG. 1 is an end view of a first embodiment gutter trap in its flatpack configuration.
Figure 4:
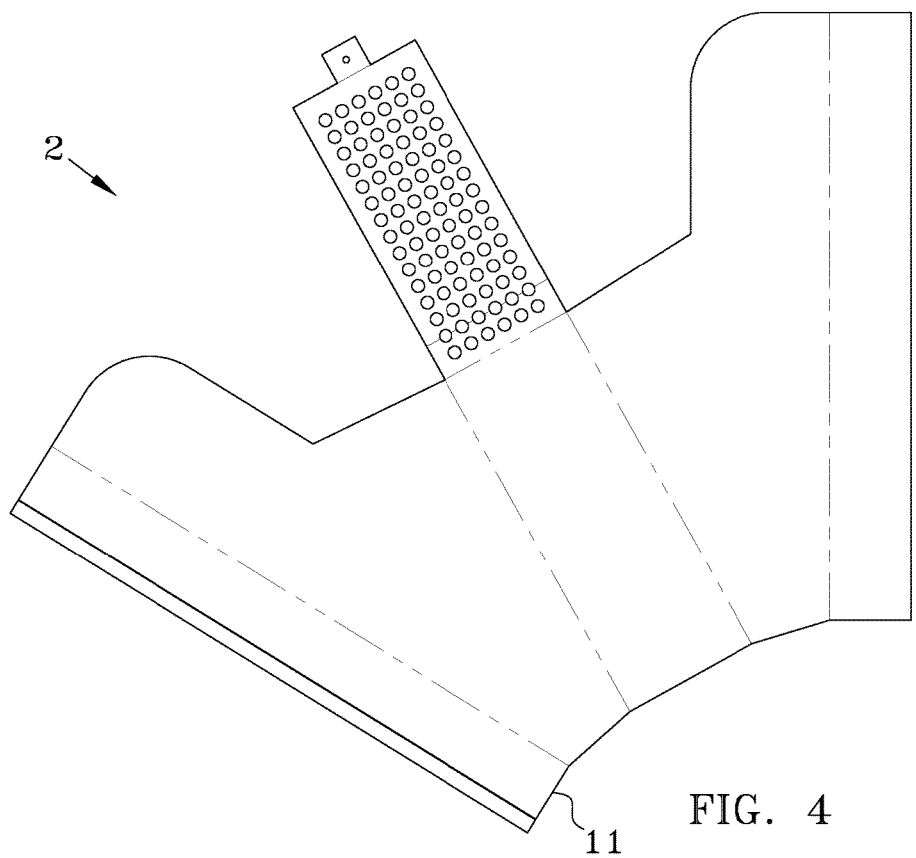
FIG. 4 is a top view of a second embodiment gutter trap in its flatpack configuration.

Each of the five consecutively adjacent plates, back inner seam plate 6, first side plate 8, front (center) plate 10, second side plate 16 and back outer seam plate 18, have a linear bottom edge 11 (FIG. 4) such that when the trap 2 is folded into its working configuration (FIGS. 11 and 12) they form a conduit open at both ends with an upper throat and a planar ring that forms the periphery of the bottom edge of the trap (planar ring edge) that is insertable into the drain line of the system. As can be seen in FIG. 1, when in its flatpack (planar) configuration these five linear edges are not collinear but form obtuse angles between adjacent edges between 150 and 179 degrees, preferably the obtuse angle between the back inner seam plate 6 and the first side plate 8, as well as between the back outer seam plate 18 and the second side plate 16 is 163 degrees and the obtuse angle between the first side plate 8 and the front (center) plate 10, as well as between the second side plate 16 and the front (center) plate 10 is 168 degrees. These 163 and 168 degree angles are necessary to ensure that there is a planar ring 50 edge formed at the bottom of the assembled trap 2.

All of the plates are rectangular, having four linear edges except for the side plates 8 and 16. Looking at the first side plate 8, and second side plate 16 it can be seen that these plates do not have a linear top edge but are configured such that the back half of the top edge is taller than the front half of their top edge. (FIG. 12) The height of the back half of the top edge matches the height of the back inner seam plate 6, and back outer seam plate 18, and the height of the front half of their top edge matches the height of the front (center) plate 10. In this fashion, the downspout 4 may be inserted into the trap 2 without resting on the leaf guard plate 12 and yet the downspout would be laterally constrained by the back halves of the first side plate 8, and second side plate 16. (FIG. 13) In this fashion the downspout 4 can be pulled forward out of the "U" to allow the leaf guard 12 to be raised and the trap 2 cleaned as necessary. Without this "U" shape, the downspout 4 would not be able to be removed from the trap 2 without disconnecting it from the reminder of the gutter system.

Figure 10:
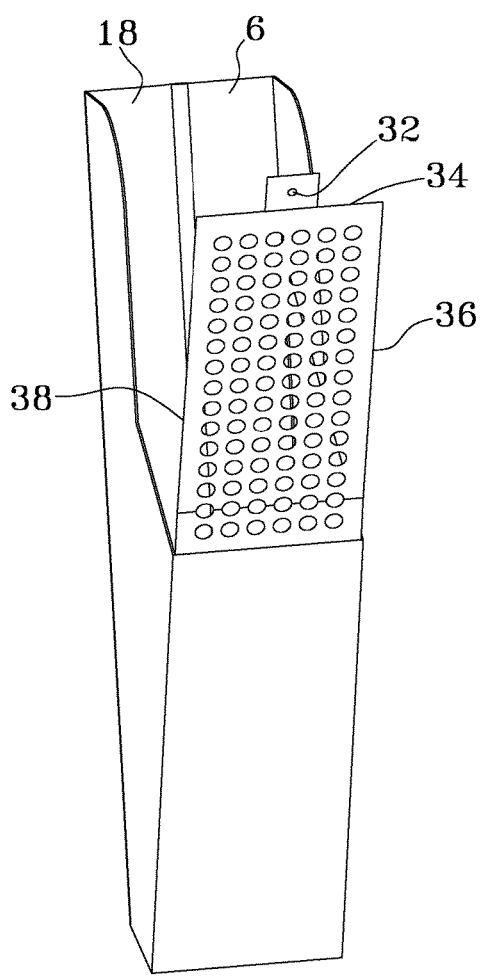
FIG. 10 is a front perspective view of a partially assembled flatpack gutter trap with the leaf guard raised.
Figure 11:
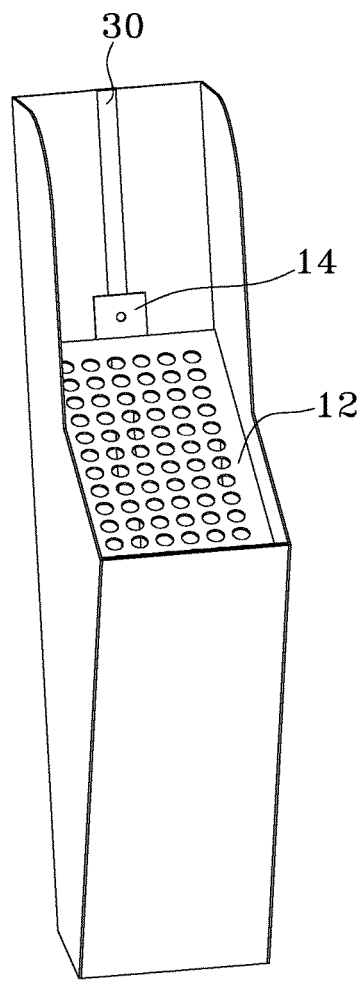
FIG. 11 is a front perspective view of a fully assembled flatpack gutter trap with the leaf guard installed.
Figure 12:
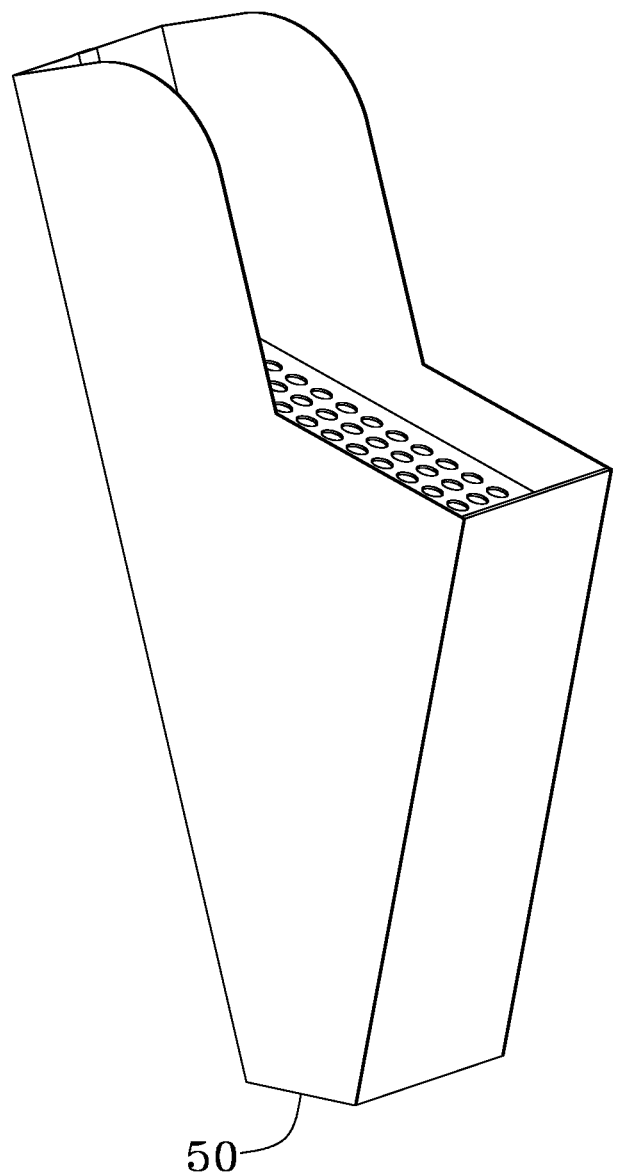
FIG. 12 is a side perspective view of a fully assembled flatpack gutter trap.

Looking at FIGS. 10 and 11 it can be seen that the lock plate 14 extends from the back side edge 34 of the leaf guard plate 12 and the leaf guard plate 12 extends from the top edge of the front (center) plate 10. The leaf guard plate 12 and lock plate 14 serve two functions. They help lock the back inner seam plate 6 and back outer seam plate 18 together at the approximate midpoint of the rear seam 30 and they add lateral strength to the entire trap 2 forming a torsion box. The mechanical fastener passing through the orifice 32 in the lock plate 14 passes through both halves of the seam 30. The leaf guard plate 12 has a dimension of length (depth) that exceeds the dimension of distance between the front (center) plate 10 and the conjoined seam plates 6 and 18 of the assembled trap 2. In this way the leaf guard plate 12 must reside at an angle with respect to the linear axis of the trap 2. The area of the leaf guard plate 12 and the area at the opening at the top of the trap 2 (commonly called the "throat" of the trap) are significantly larger than the cross sectional area of a conventional downspout 4. This causes any debris caught by the leaf guard plate 12 in the throat to be washed to the front of the leaf guard plate 12 outside of the "U" where the downspout 4 resides (from under the downspout) so that it may be washed out of the trap throat or scooped out by hand.

In an alternate embodiment (not illustrated) the leaf guard plate may have two additional lock plates 14 extending from its side edges 36. These lock plates 14 would extend perpendicular to the lock plate 14 on the top edge, and would be mechanically fastened to the first side plate 8, second side plate 16 with the purpose of adding additional strength and rigidity to the trap 2. Although the preferred embodiment uses self drilling, self tapping screws for the mechanical fasteners on the lock plates 14, other mechanical fastening means may be employed.

It is to be noted that the crease lines and the angles involved in the geometric configuration of the first and second embodiments are identical. Only the design of the seam differs.

Figure 5:
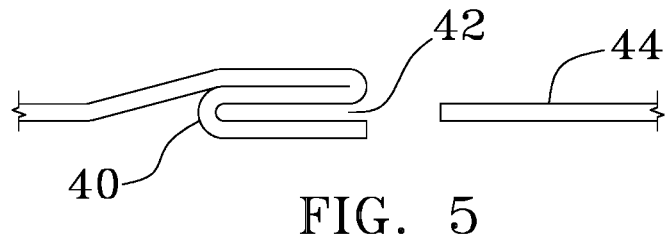
FIG. 5 is a partial end view of both sides of the assembly seam of a first embodiment gutter trap in an unassembled configuration.
Figure 6:
FIG. 6 is a partial end view of both sides of the assembly seam of a first embodiment gutter trap in an assembled configuration.

The plates on either side edge of the front (center) plate 10, the first side plate 8 and second side plate 16, are mirror images taken about the side crease lines of the front (center) plate 10. The back inner seam plate 6 has a first half of a lockingly engagable seam 30 and back outer seam plate 18 has a second half of a lockingly engagable seam 30. These seam halves involve the linear overlapping of substrate from these two plates along the rear face of the trap 2 that lies along the linear axis of the trap 2. FIGS. 5 and 6 show the preferred embodiment of the seam 30 unassembled and assembled. Slot seam half 40 forms a recess 42 into which tab seam half 44 is inserted until its leading edge abuts the slot seam half 40 at the rear of the recess 42. With the tab seam half 44 in the slot seam half 40 the exterior sides of the slot seam half 40 may be mechanically crimped of the seam 30 glued, fused, pined, screwed or bolted in the field. The preferred embodiment uses portable hand tools to crimp the seam halves together and the seam is reinforced with a mechanical fastener passing through the orifice 32 in the lock plate 14 as detailed above. The screw is of a length that it may continue beyond the trap 2 and secure the trap 2 to the wall of the building if conditions permit. Additional self drilling self tapping screws may be used in the field to reinforce the seam 30 as needed and to secure the trap 2 to the building. In this manner, when the mechanical fastener in the lock plate 14 is removed and the leaf guard plate 12 is raised to clean out the trap 2, the trap 2 will remain in position.

Figure 7:
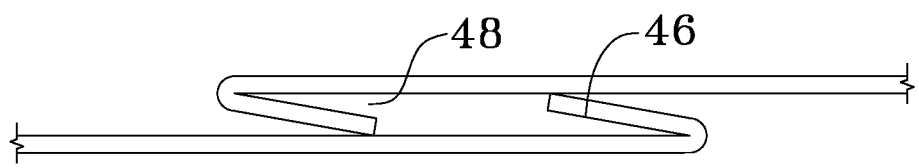
FIG. 7 is a partial end view of both sides of the assembly seam of a second embodiment gutter trap in an unassembled configuration.
Figure 8:
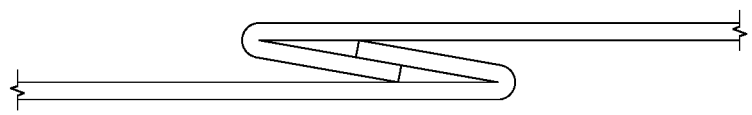
FIG. 8 is a partial end view of both sides of the assembly seam of a second embodiment gutter trap in an assembled configuration.

There is a plethora of other mechanical and geometric configurations that may be utilized to make the seam 30, as is well known by one of ordinary skill in the art. For example, in the alternate embodiment seam of FIGS. 7 and 8 there are identical, interlockable hooks 46 that will engage each other's folds 48 when the trap 2 Additional self drilling self tapping screws may be used in the field to reinforce the seam 30 as needed. These hooks 46 are engageable when first side plate 8 and second side plate 16 are bent or folded beyond 90 degrees with respect to the front (center) plate 10. The folding of the leaf guard plate 12 forces the side plates 8 and 16 back into a parallel configuration and draws the hooks 46 to the back end of the other hook's fold. As with the preferred embodiment seam, the exterior sides of the slot seam half 40 may be mechanically crimped of the seam 30 glued, fused, pined, screwed or bolted in the field.

Once assembled, it can be seen that the trap 2 has a linear bottom edge 50 at its bottom end that is sized for insertion into the open end of a commonly sized drainpipe. (FIG. 12) The top end of the trap 2 has a "U" shape configuration that is sized to accommodate a commonly sized gutter downspout 4 between its three sides that are formed by the bending of the side plates 8 and 16 and the bending and seaming of the back inner seam plate 6 and back outer seam plate 18. This "U" provides lateral stability to the bottom end of the downspout 4, allows the downspout 4 to be removed from the trap 2, and also allows the debris that is filtered out by the leaf guard plate to accumulate at the front half of the sloped leaf guard 12 and be scooped out by hand. It is to be noted that the downspout 4 will not rest on the leaf guard plate 12, but rather it will reside at a distance about the leaf guard plate 12 in the throat of the trap to allow debris to be washed to the front of the throat.

The material of construction may be aluminum, tin, copper, polymer or galvanized steel. It may be coated, treated or painted. A flex agent may be added to the surface treatment to eliminate chipping at the creases.

In the field, the trap 2 is hand folded by lying a crease 3 across any object with a sharp, linear edge (such as a piece of lumber) and applying a uniform pressure to the plate to be bent. This is repeated with the other plates and lastly the seam 30 is engaged, bending the first side plate 8 and second side plate 16 beyond 90 degrees with the front (center) plate 10 as necessary to engage the seal 30. The seal is crimped, and the leaf guard plate 12 is folded into the body of the enclosure formed by the five consecutively adjacent plates, (back inner seam plate 6, first side plate 8, front (center)

plate 10, second side plate 16 and back outer seam plate 18), and the mechanical fastener is affixed to the seam 30 and the lock plate 14, passing into the building if convenient. Additional mechanical fasteners are used as necessary to further secure the seam 30 and the trap 2 to the building. If the additional two lock tabs 14 are used then a pair of mechanical fasteners affix them to the first and second side plates 8 and 16.

While certain features and aspects have been described with respect to exemplary embodiments, one skilled in the art will recognize that numerous modifications are possible. Similarly, while certain functionality is ascribed to certain system components, unless the context dictates otherwise, this functionality can be distributed among various other trap components in accordance with the several embodiments.

Moreover, while apparatus described herein is described in a particular order for ease of description, unless the context dictates otherwise, various procedures may be reordered, added, and/or omitted in accordance with various embodiments. Moreover, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A gutter trap for use with a downspout of a gutter system comprising:
   a unitary, planar substrate with a series of plates formed thereon a face of said planar substrate by a series of V shaped linear creases formed between a pair of opposing edges on said face of said planar substrate at the edges of said plates; wherein said series of plates are folded, and said opposing edges joined at a seam to assemble a conduit with an upper throat and a bottom planar ring edge, said bottom planar ring edge sized for insertion into a commercially sized drain pipe;
   a leaf guard plate formed on said planar substrate and extending from a plate of said series of plates, at a linear crease of said series of V shaped linear creases and extending across said upper throat to said seam and residing at an angle with respect to said planar ring edge;
   wherein said series of plates are contiguous, made of a series of five consecutively adjacent plates having a central plate and a series of two consecutively adjacent rectangular plates that extend from said central plate of said series of consecutively adjacent five plates.

2. The gutter trap of claim 1 comprising:
   a back inner seam plate;
   a first side plate;
   a center plate;
   a second side plate;
   a back outer seam plate;
   wherein said leaf guard plate has a series of orifices formed therethrough, and is one plate of said series of two consecutively adjacent rectangular plates that extend from said central plate; and
   a lock plate, said lock plate extending from said leaf guard plate; and
   wherein said seam plates and said lock plate have a single crease, said side plates and said leaf guard plates have two creases, and said center plate has three creases.

3. The gutter trap of claim 2 wherein said series of said five consecutively adjacent plates is connected to form said conduit by a linear seam of a conjointed first half seam formed on the edge of said back inner seam plate and a second half seam formed on the edge of said back outer seam plate.

4. The gutter trap of claim 3 wherein said first seam half is formed of overlapping substrate that forms a recess into which a tab of said second half seam is insertable to form a lockingly engageable crimpable seal.

* * * * *